United States Patent [19]

Lin

[11] Patent Number: 4,531,197

[45] Date of Patent: Jul. 23, 1985

[54] REAL-TIME FOURIER TRANSFORMER USING ONE ACOUSTO-OPTICAL CELL

[75] Inventor: Samuel S. Lin, Alexandria, Va.

[73] Assignee: The United States of America as represented by the Secretary of the Navy, Washington, D.C.

[21] Appl. No.: 488,924

[22] Filed: Apr. 27, 1983

[51] Int. Cl.[3] .......................... G06G 7/19; G02F 1/11

[52] U.S. Cl. .................................... 364/827; 364/822; 350/162.12; 350/320; 350/358

[58] Field of Search ........................ 364/807, 821–822, 364/826–827, 837; 350/162.12, 317, 320, 353, 358

[56] References Cited

U.S. PATENT DOCUMENTS

| | | | |
|---|---|---|---|
| 4,012,120 | 3/1977 | Kagiwada et al. | 364/821 X |
| 4,049,958 | 9/1977 | Hartmann | 364/821 X |
| 4,126,834 | 11/1978 | Coppock | 332/7.51 |
| 4,139,277 | 2/1979 | Berg et al. | 350/358 |
| 4,164,717 | 8/1979 | Blazey | 350/358 X |
| 4,225,938 | 9/1980 | Turpin | 364/822 |
| 4,326,778 | 4/1982 | Berg et al. | 350/358 |
| 4,339,176 | 7/1982 | Lee | 350/162.12 X |
| 4,426,134 | 1/1984 | Abramovitz et al. | 350/358 |
| 4,471,445 | 9/1984 | Pernick | 364/827 X |

OTHER PUBLICATIONS

J. N. Lee et al., "Discrete Fourier Transformation Using a Time Integrating, Acousto-Optical Signal Processor" Applied Physics Letters, vol. 41, pp. 131–133, 1982.

S. Lin, "Compact Acousto-Optical Signal Processor for Real-Time Fourier Transformation", Applied Optics vol. 21, pp. 3227–3229, Sep. 1982.

*Primary Examiner*—Jerry Smith
*Assistant Examiner*—Gary V. Harkcom
*Attorney, Agent, or Firm*—Robert F. Beers; William T. Ellis; Charles S. Guenzer

[57] ABSTRACT

An optical Fourier transformer comprising an acousto-optical cell such as a Bragg cell upon which is impressed a chirp signal, a laser which is modulated by the signal to be analyzed, optical means for dividing the laser beam into two beams which strike one side of the acousto-optical cell with opposite orientations. The chirped acousto-optical cell diffracts the beams incident thereupon. The two diffracted beams are then recombined with their original orientations reestablished so that they interfere upon striking a time-integrating photo-detector array. The distribution of integrated intensities is related to the Fourier transform of the signal to be analyzed. Polarization discrimination can be used to split and recombine beams and to reduce extraneous beams. Background noise and direct current terms can be eliminated by comparing runs with 180° of phase shift added between runs.

15 Claims, 7 Drawing Figures

REAL-TIME FOURIER TRANSFORMER USING ONE ACOUSTO-OPTICAL CELL

CROSS-REFERENCE TO RELATED APPLICATIONS

U.S. patent application Ser. No. 488,930 entitled "Read Time Fourier Transformer Using One Acousto-Optical Cell" also filed by Applicant is related to this case. A Terminal Disclaimer has been filed in conjunction with the above-referenced Application for the portion of the term of any patent granted on this Application.

BACKGROUND

1. Field of the Invention

The field of the invention in general is an optical signal processor and in particular is an optical Fourier transformer utilizing one acousto-optical cell.

2. Description of the Prior Art

Fourier transforms are used in many fields of technology for converting information from one representation to another. Fourier transformations of time-domain signals are particularly important in signal processing such as in the fields of radar and sonar for which the one-dimensional transformation is given by $$S'(f) = \int_{-\infty}^{+\infty} S(t) \exp(-i2\pi ft)\, dt. \quad (1)$$

The function S(t) is the time-domain signal and S'(f) is the frequency-domain signal which is the Fourier transform of S(t). The conventions used to define Fourier transformations may be somewhat different from those of Eqn. (1) but they only introduce additional constants of proportionality.

For signal processing of arbitrary waveforms, the transformation of Eqn. (1) cannot be performed analytically. One available method to Fourier transform signals involves sampling the signal S(t), digitizing the samples, and then using a computer to numerically transform S(t) to S'(f). Elaborate but efficient computer codes have been written for this task under the generic name of fast Fourier transforms (FFTs). Alternatively electronic chips have been implemented which perform the parallel analog equivalent of the digital FFT.

These FFT methods, although fast, are not nearly fast enough for the requirements of evolving systems. Not only are they throughput or bandwidth limited, but they are not real-time Fourier transformers in the respect that the signal S(t) must, in general, be completed before the transformation procedure is initiated. Furthermore, the fastest electronic FFTs tend to be heavy or power-consuming.

SUMMARY OF THE INVENTION

Accordingly it is an object of this invention to provide a real-time Fourier transformer.

It is a further object of this invention to provide a compact, low-power Fourier transformer.

It is yet a further object of this invention to provide a Fourier transformer that is accurate and free of environmental perturbations.

The invention is an acousto-optical processor for performing Fourier transforms in which a temporally varying signal modulates the intensity of a coherent light source. The resulting beam is split into two beams which are directed onto one face of an acousto-optical cell such as a Bragg cell with corresponding rays of the two beams hitting opposite ends of the Bragg cell upon which is impressed a linear FM or chirp signal. The acousto-optic cell diffracts both beams and the diffracted beams of the same order are recombined with the corresponding rays being coincident such that they interfere. The beams can be split and combined by polarization techniques. Optical detectors integrate the light intensity at points across the combined beam. The spatial distribution of integrated intensity is related to the Fourier transform of the temporally varying signal. Noise and DC background can be eliminated by introducing 180° of additional phase in one of the beams between successive runs and comparing the intensities of the runs.

DESCRIPTION OF THE PREFERRED EMBODIMENTS

Figure 1:
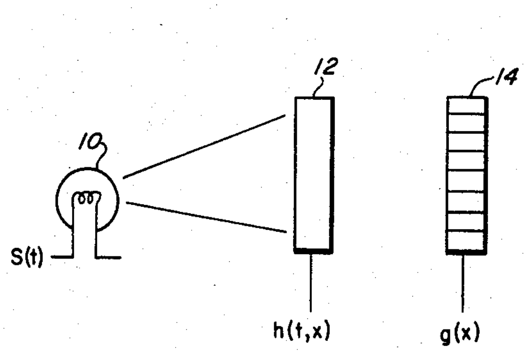
FIG. 1 is a pictorial representation of an optical processor.

Referring now to the drawings, wherein like reference numerals designate identical or corresponding parts throughout the several views, and more particularly to FIG. 1 thereof, computation of the type required by the Fourier transformation of Eqn. (1) can be performed by optical processors. An optical processor of simple but quite general design, shown in schematic representation in FIG. 1, comprises a light source 10, the intensity of which is controlled by a temporally varying input signal S(t). The light source uniformly illuminates an acousto-optical cell 12 which, by one of various mechanisms, affects the light passing through it according to a function h(t,x), which in this general formulation is a function of both time and the distance along the acousto-optical cell 12. There are several types of interactions possible in the acousto-optical cell. For this initial discussion, let the interaction be a modulated photo-elastic interaction which affects the phase of the light passing through the cell.

An optical detector array 14 is positioned to intercept the light passing through the acousto-optic cell 12 and is of a type which integrates the light intensity for a time T to produce the integrated intensity function g(x). It is assumed that each of the array elements can be individually read. For convenience, it is further assumed that there is a direct relationship between the positions x along the acousto-optic cell 12 and the detector array 14 so that the two positions are commonly labeled. The integrated intensity function is then given by $$g(x) = \int^{T} h(t,x)\, S(t)\, dt. \qquad (2)$$

It can be seen that the optical processor of FIG. 1 acts to transform the function S(t) into the function g(x) according to the kernel h(t,x). The complication that the transformation, such as the Fourier transform of Eqn. (1), is integrated over infinite limits while the integration of Eqn. (2) is limited to a finite time T is not a major problem if the function S(t) is periodic or of negligible value for times longer than T.

The acousto-optic cell 12 having a generalized kernel h(t,x) is difficult to build and operate. A much simplified acousto-optic cell 12 relies on the fact that sound waves propagate through a crystal at a fixed and finite velocity v which is near 6 millimeters per microsecond for most crystals. If a signal h(t) is impressed on one end of an acousto-optic cell 10 by a piezo-electric transducer so as to launch a sound wave of velocity v and if the cell 12 is terminated at its other end so that no reflections occur, then the kernel of the cell assumes the simplified form $h(t,x)=h(t-x/v)$.

A form of kernel found particularly useful in implementing Fourier transforms is a chirp of linear FM in which the signal produced by the transducer is $$h(t)=\cos(\omega_o t+\alpha t^2/2). \qquad (3)$$

The control circuit producing the chirp can be a linear FM sweep generator. The frequency $\omega_o$ is the carrier frequency of the acousto-optic cell and may be 1 GHz. However the frequency is swept at a chirp rate $\alpha$ to produce a linear FM signal having a constant envelope. Usually the frequency swept is a small fraction of the carrier frequency.

One type of acousto-optic cell found particularly useful is a Bragg cell in which a wave launched by a transducer on one end of it will affect the refractive properties of the cell according to the local amplitude of the wave in the cell. A multi-wavelength waveform present on the Bragg cell will cause the cell to operate as a diffraction grating and to produce diffraction patterns of order n at an angle $\theta_B$ according to the Bragg equation $$\sin \theta_B = n\lambda/2\,a\,. \qquad (4)$$

where a is the period of the wave on the Bragg cell. $\lambda$ is the wavelength of the incident radiation and $\theta_B$ is the Bragg angle.

Figure 2:
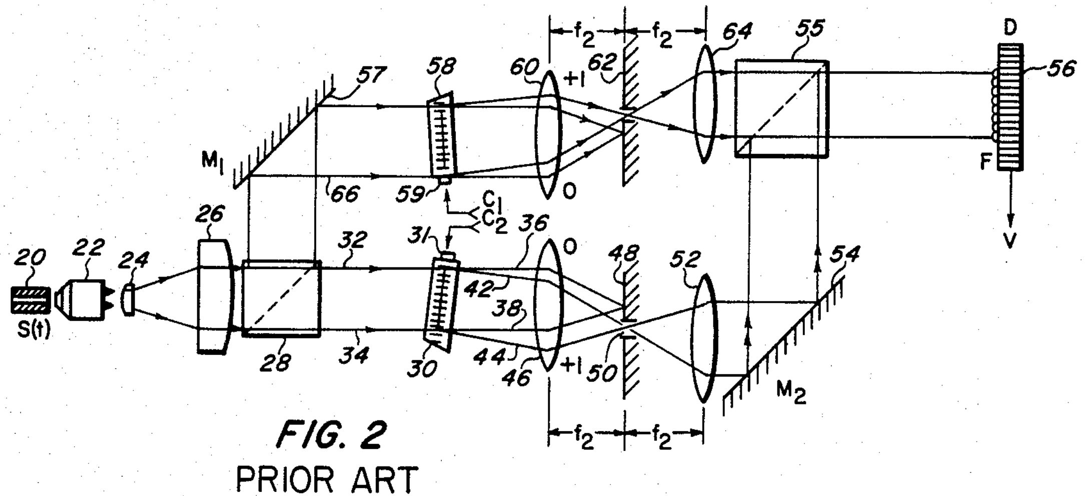
FIG. 2 PRIOR ART
FIG. 2 is a schematic representation of a prior art optical Fourier transformer.

A Fourier transformer using the above concepts has been described by J. N. Lee et al. in Applied Physics Letters, volume 41. pages 131–133, 1982 which is herein incorporated by reference and is shown generally in FIG. 2. A laser 20 produces a beam of coherent light which is expanded but its collimation maintained by a microscope objective 22 and two cylindrical lenses 24 and 26. The relatively large collimated beam is then directed through a first beam splitter 28 which divides the beam into two equal beams. The lower beam is directed through a Bragg cell 30 onto which is applied a chirp signal through a piezo-electric transducer 31. In FIG. 2 is shown an incident upper ray 32 and lower ray 34 of the lower beam passing through the Bragg cell 30 as undiffracted upper and lower rays 36 and 38 respectively (i.e. of order 0) but also creating diffracted upper and lower rays 42 and 44. It will be assumed that the diffracted rays 42 and 44 are of order +1, i.e. n=1 in Eqn. (4). With the correct orientation of the Bragg cell 30, both −1 orders can also be used. For maximum efficiency of conversion of the incident rays 32 and 34 into +1 diffracted rays, the Bragg cell 32 is canted at the lowest order Bragg angle relative to the beam and the +1 diffracted rays will be at twice the Bragg angle relative to the incident rays 32 and 34. The beams containing the diffracted and undiffracted rays 42, 44. 36 and 38 are focussed by a lens 46 onto a mask 48 positioned such that the +1 diffracted rays 42 and 44 pass through a slit 50 in the mask 48 while the undiffracted rays 36 and 38 and all other orders of diffracted rays fall upon the mask 48 and are absorbed. The diffracted rays 42 and 44 are then recollimated by another lens 52. This combination of lenses 46 and 52 and a mask 48 is known as a spatial filter and can be used to select one order of diffracted beam while suppressing the other orders. The rays 42 and 44 are then reflected from a mirror 54 and then enter another beam splitter 55 which will act also as a beam combiner and will direct the beam toward an optical detector array 56.

The other beam resulting from the the first beam splitter 28 is treated in much the same way as the first beam, reflecting from a mirror 57, passing through a second Bragg cell 58 with a transducer 59 on one end, a lens 60, and through a mask 62 positioned to pass +1 diffracted rays, being recollimated by another lens 64 onto the beam splitter 55. However it is required that the beam be oriented such that the ray 66 passing through the end of the Bragg cell 58 nearest the transducer 59 have originated from the same ray that produced the lower ray 34 passing through the end of the other Bragg cell 30 furthest from the transducer 31. It is further required that upon exiting the second beam splitter 55 these two rays be coincident so they can interfere with each other upon arriving at the detector array 56. The apparatus shown in FIG. 2 amounts to a Mach-Zehnder interferometer using the +1 order light diffracted from the Bragg cells 30 and 58. The two Bragg cells 30 and 58 driven in opposite directions by a chirp signal are in the two arms of the Mach-Zehnder interferometer.

Because of the interference between the two beams, many of the lowest order terms of the beams cancel to leave mostly cross-terms between the beams. If the difference in separation of the location in the respective Bragg cells 30 and 58 through which the rays from the respective transducer is denoted by a relative delay $\tau$ and if the element on the detector array 56 that detects both these rays is also denoted by $\tau$, then it can shown that the element accumulates a charge after an integration time T of $$q(\tau) = k_1 \cdot \int^{T} I(t)\, dt + k_2 \cdot Re\left\{ \exp(-2i\omega_o\tau) \cdot \int^{T} S(t) \exp(-i2\alpha\tau t)\, dt. \right. \qquad (5)$$

In Eqn. (5), I(t) is the laser intensity, $k_1$ and $k_2$ are proportionality constants, $\omega_o$ and $\alpha$ are the carrier frequency and the chirp rate respectively of the chirp signal. The first term in Eqn. (5) is a signal dependent direct current (DC) term, which must be eliminated to yield the second term which contains the Fourier transform of S(t) modulating the spatial carrier term exp($-i2\omega_o\tau$).

The Fourier transformer of FIG. 2 has been successfully tested. However it suffers from numerous problems. It requires careful equilization of the pathlength, especially when the laser 20 is under pulse modulation, in order to ensure good fringe visibility. Furthermore because the optical paths are not common, the interferometer is also sensitive to phase perturbations that the environment introduces in one arm of the interferometer but not in the other. A further practical limitation is that two Bragg cells are required and good quality matched Bragg cells are expensive and difficult to obtain.

The performance of the Mach-Zehnder optical Fourier transformer can be greatly improved if only a single Bragg cell is used. Such an optical Fourier transformer is the subject of a patent application simultaneously filed by this inventor and herein incorporated by reference. This Fourier transformer uses a beam splitter to divide a beam of collimated coherent light into two separate beams. By the use of passive optical components these two beams are directed onto opposing faces of a single acousto-optical cell. Furthermore one of the beams is inverted so that corresponding rays of the two beams pass through opposite ends of the acousto-optical cell. Because of the finite velocity of the chirp signal through the Bragg cell, different wavelength signals simultaneously exist on different parts of the Bragg cell. Both beams upon passing through the acousto-optic cell while it is being chirped produce diffracted beams. Optical components then redirect and invert the diffracted beams so that corresponding rays in the beams are parallel and interfere upon being detected by a photo-detector array. Such an optical Fourier transformer has been successfully tested. However it requires many optical components that need to be carefully maintained in alignment. The many optical paths that need to be kept separate results in a relatively large Fourier transformer and one that is sensitive to misaligment.

Figure 3:
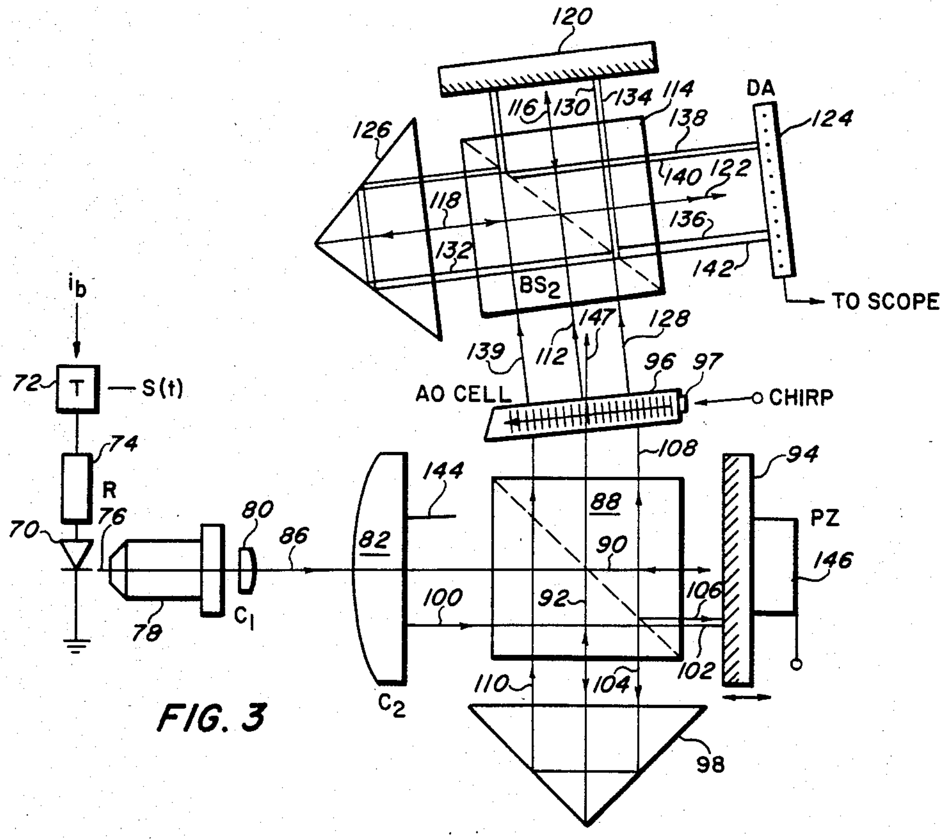
FIG. 3 is a schematic cross-section of an embodiment of the invention using non-polarized light.

In this invention, a Fourier transformation is accomplished by passing beams in one direction through a single acousto-optical cell. This invention has been described by the inventor in the article, S. Lin, "Compact acousto-optical signal processor for real-time Fourier transformation," Applied Optics. volume 21. pages 3227–3229 (1982), herein incorporated by reference. As shown in cross-section in FIG. 3 a diode laser 70 is driven by a combination of bias current $i_b$ and the temporally varying signal S(t) which are combined in a bias tee 72 which combines alternating current (AC) and DC signals. A load resistor 74 separates the bias tee 72 from the diode laser 70. The laser 70 as a result produces a beam 76 of coherent light which is spread and collimated into a collimated beam after it passes through a microscope objective 78 and two cylindrical lenses 80 and 82. The central ray 86 of the collimated beam is shown in FIG. 3 although it is to be understood that the beam has substantial width. For clarity in presenting the invention, the central ray will be understood to represent the entire beam. The height of the beam out of the plane is unimportant in this embodiment. The collimated beam 86 is directed to a first beam splitter 88 where the beam 86 is divided into two beams 90 and 92. One beam 90 is reflected back by a first mirror 94 along the same path to the beam splitter 88 in which the beam is at least partially reflected toward a Bragg cell 96. The other beam is reflected by a first inverting reflector 98 such as a roof prism or a cat's eye reflector back through the beam splitter 88 in which the beam is at least partially transmitted toward the Bragg cell 96. The inverting reflector 98 both reflects the beam 92 and inverts its sides, right for left.

If a single offset ray 100 of the collimated beam offset from the beam's central ray 86 is considered, the beam splitter 88 produces two offset rays 102 and 104. The first mirror 94 reflects its ray 102 as a ray 106 back along the same path here shown in FIG. 3 slightly offset for clarity. Ray 106 is then partially reflected in the beam splitter 88 to form ray 108 which is incident on one side of the Bragg cell 96. On the other hand, the ray 104 reflected by the inverting reflector 98 is reflected back as a ray 110 on the opposite side of the central ray 92 from the incident ray 104. As a result, that part of the ray 110 transmitted through the beam splitter 88 will be incident on that end of the Bragg cell 96 which is opposite the end struck by the corresponding ray 108 reflected from the mirror 94.

The Bragg cell 96 may alternately be other types of acousto-optical cells in which there is an optical interaction on light passing through it produced by a signal independently impressed on the cell. In the Bragg cell implementation, a chirp signal of the form $\cos(\omega_o\tau+\alpha t^2/2)$ is impressed on one end of the Bragg cell 96 through a transducer 97 and the resultant wave travels at a finite velocity across the cell 96 before being characteristically terminated at the other end. The Bragg cell 96 produces a diffracted beam 112 of order +1 from both the mirror reflected beam 90 and invertor reflected beam 92. The efficiency of diffraction is maximized for an orientation of the Bragg cell 96 being at the Bragg angle with respect to the beam 92.

The diffracted beam 112 is then directed to a second beam splitter 114 which divides the diffracted beam 112 into two equal beams 116 and 118. One of the split beams 116 is directly reflected by a second mirror 120 onto its original path back into the second beam splitter 114. Therein the split beam 116 is partially reflected into a final beam 122 incident onto an integrating photodetector array 124 set perpendicularly across the final beam 122. The individual elements of the array 124 thereby time-integrate the intensity of portions of the final beam 122. Similarly the other split beam 118 is reflected from a second inverting reflector 126 back into the second beam splitter 114 and is partially transmitted therethrough into the final beam 122 onto the detector array 124. The final beam 122 is thus composed of rays coming from both the second mirror 120 and the second inverting reflector 126 and the various rays interfere with each other.

The rays resulting from the one offset ray 100 are traced through the second beam splitter 114 in the following manner. The ray 108 reflected from the first mirror 94 is diffracted in the Bragg cell 96 into a diffracted ray 128 which is split in the second beam splitter 114 into two rays 130 and 132. One ray 130 is reflected from the second mirror 120 into a ray 134 back along its same path into the second beam splitter 114 and reflected partially therefrom into a direct-direct final ray 136. The nomenclature direct-direct refers to the fact that this ray resulted from direct reflections on the first and second mirrors 94 and 120. The ray 132 however is inverted on its reflection from the inverting reflector 126 into a direct-inverted ray 138 that is incident on the detector array 124. The nomenclature direct-inverted means that the ray was directly reflected at the first beam splitter 88 but inverted subsequently at the second beam splitter 114. Similar ray tracing of the ray 139 resulting from the first inverting reflector 98 produces an inverted-direct ray 140 that is coincident with the direct-inverted ray 138 as they strike the detector array 124. Also produced is an inverted-inverted ray 142 coincident with the direct-direct ray 136.

The inverted-direct ray 138 and the direct-inverted ray 140 pass through opposing ends of the Bragg cell 96 and interfere with each other to produce an integrated intensity in the detector array 124 proportional to the second term of Eqn. (5). Likewise the direct-direct ray 136 and inverted-inverted ray 142 also produce an integrated intensity proportional to the second term of Eqn. (5). However because the direct-direct ray was reflected twice while the inverted-inverted ray was inverted twice, differential errors are more likely to occur in combining these two rays 136 and 142 rather than the rays 138 and 140 which have similar paths. It is to be further appreciated that the offset ray 100 produces rays that fall on the detector array 124 at two points and that there is the possibility of confusion of results as it would be unknown if the distribution of collected charge on the detector array 124 is caused by the offset ray 100 or another ray 144 on the other side of the collimated beam 86.

The DC term or first term of Eqn. (5) can be eliminated from the Fourier transformer by recording the signal on the individual elements of the detector array 124 and then repeating the signal S(t) for a second run of the Fourier transformer. However on the second run the phase length of one of the separated paths is increased by a total of 180°. One method of accomplishing this is to attach the first mirror 94 to a piezo-electric driver 146 which translates the mirror 94 one-quarter of a wavelength of the laser radiation along the axis of the beam 90. The charge distribution on the detector array 124 from the second run is then compared to the charge distribution from the first run in a data controller such as a computer. Any difference result from contributions of the second term of Eqn. (5) while the constant contribution of the first term cancels. The undiffracted beam 147 can be eliminated by use of a spatial filter.

Figure 4:
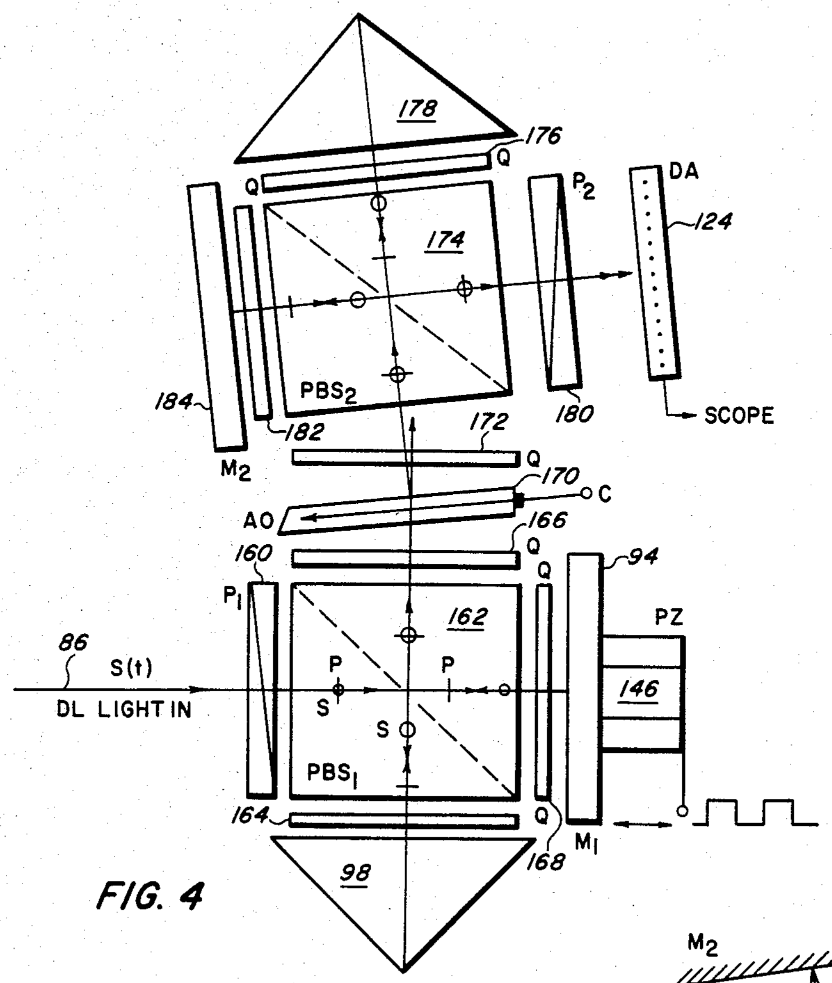
FIG. 4 is a schematic cross-section of an embodiment of the invention using two beam splitters and polarization discrimination.

Many of the disadvantages hitherto described can be eliminated by polarization discrimination as used in a second embodiment of the invention as shown in cross-section in FIG. 4. A collimated beam 86 of coherent light onto which is impressed the signal S(t) is passed through a first polarizer 160 with its polarization vector set at 45° to the plane of the cross-section. There results two coincident beams of equal intensity of vertically and horizontally polarized radiation, called the initial s-beam and the initial p-beam respectively. Both these beams then pass into a first polarization beam splitter 162 wherein the initial s-beam is reflected to a first quarter-wave plate 164 with its fast axis set at 45° to the normal or to the polarization direction of the s-beam. The beam is then reflected by the inverting reflector 98 back through the first quarter-wave plate 164 to the first polarization beam splitter 162. Because of the double pass through the first quarter-wave plate 164 the polarization of the initial s-beam is changed to p-polarization and that inverted beam therefore passes through the first polarizing beam splitter 162 to a second quarter-wave plate 166 with its fast axis at 45°. Similarly the initial p-beam is transmitted through the polarization beam splitter 162 and thence through a third quarter-wave plate 168 also set at 45° to the normal to the mirror 94 and back through the third quarter-wave plate 168 into the first polarizing beam splitter 162. The third quarter-wave plate 168 has changed the initial p-beam into a direct beam with s-polarization so that it reflects within the first polarizing beam splitter 162 toward the second quarter-wave plate 166 and through it. Both the direct and inverted beams in passing through the second quarter-wave plate 166 are converted to circular polarizations of opposite senses. The orientation of the fast axes of the quarter-wave plates 164, 166, and 168 can be easily understood by one skilled in polarization optics keeping in mind the intended light polarizations and the inversion of polarization upon reflection.

Both beams then pass through a Bragg cell 170 on which a shear mode chirp signal is impressed. Both beams being of circular polarization will diffract with equal efficiency and produce diffracted beams of +1 order having circular polarization of opposite sense from that of the incident respective beams. The diffracted beams pass through a fourth quarter-wave plate 172 similarly with its fast axis at 45° wherein the diffracted beam resulting from the initial p-beam is changed from circular to p-polarization. Similarly the initial s-beam produces an s-polarization diffracted beam. Both these beams then pass into a second polarization beam splitter 174. The p-polarized beam is transmitted through the second beam splitter 174 and then passes through a fifth quarter-wave plate 176 set at 45° into a second inverting reflector 178 from which it reflects back through the quarter-wave plate 176 into the second beam splitter 174. Because of the double pass through the fifth quarter-wave plate 176 the initial s-beam has been converted to p-polarization so that it is reflected from the second beam splitter 174 through a second polarizer 180 with an orientation perpendicular to that of the first polarizer 160. Similarly the s-polarized beam is reflected by the second polarizing beam splitter 174 through a sixth quarter-wave plate 182 set at 45° and is reflected by a flat mirror 184 back through the sixth quarter-wave plate 182. Because of its then p-polarization it is transmitted through the second polarizing beam splitter 174 and through the second polarizer 180.

Each of the initial beams eventually is directly reflected once by one of the mirrors 94 and 184 and is also inverted by one of the inverting reflectors 98 and 178 so as to equalize pathlengths and to reduce differential path noise. Both beams after passing the second polarizer 180 have the same polarization so that they interfere. Furthermore the rays that are interfering have passed through opposing ends of the Bragg cell 170. The interfering beams then fall on the photo-detector array 124 which measures a distribution related to the Fourier transform of S(t). Subtraction of background and the DC term is accomplished by changing the phase length of one of the beams by 180° on different runs of S(t) and comparing the distribution on the detector array 124 between runs. One method of accomplishing this is to attach the mirror 94 to a piezo-electric driver 146 that moves the mirror 94 by one-quarter of a wavelength of the laser light between runs.

Figure 5:
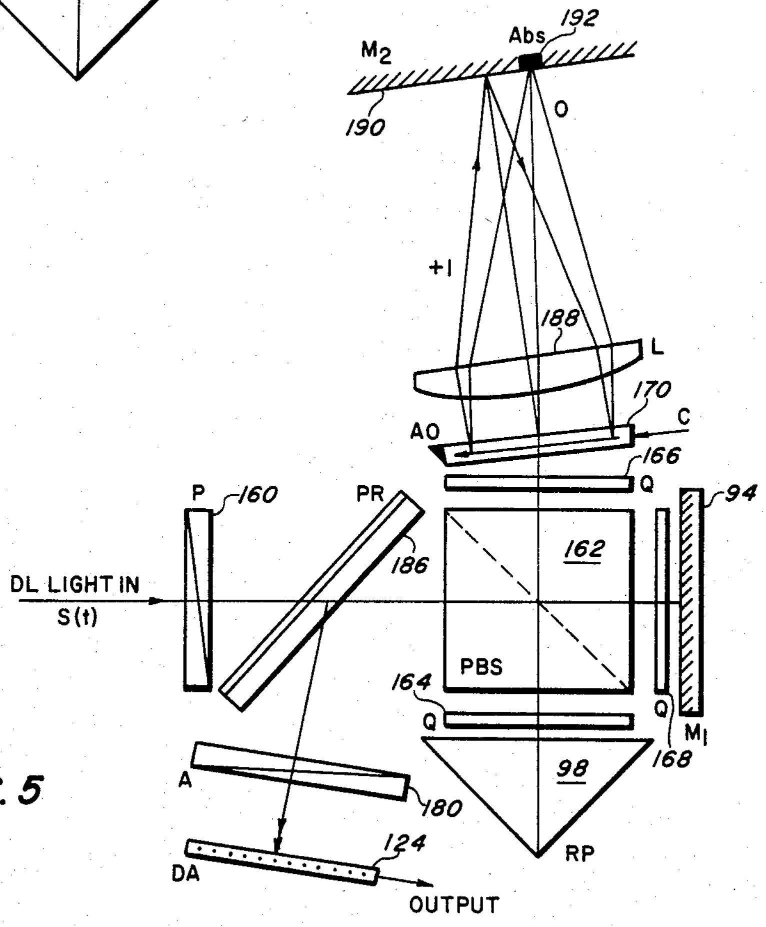
FIG. 5 is a schematic cross-section of an embodiment of the invention using one beam splitter and polarization discrimination.

The number of components can be reduced by making the first polarizing beam splitter 162 work in two directions as shown for a third embodiment presented in cross-section in FIG. 5. The components surrounding the first beam splitter 162 are the same as for the embodiment of FIG. 4 except that a polarization reflector 186 is placed between the first polarizer 160 and first beam splitter 162 with its polarization orientation set to transmit light transmitted by the first polarizer 160. A glass wedge oriented at the Brewster angle to the beam performs such a function as does a dielectric thin film matched to the laser radiation. The other beam splitter is replaced by an inverting reflector such as a combination of a convex lens 188 with its focal point near a third mirror 190. The part of the third mirror 190 where the undiffracted beam is focussed is covered with an optical absorber 192. The beams after being inverted and reflected pass through the Bragg cell 170 without being appreciably diffracted. From thence the beams enter the polarization beam splitter 162 in which the beam which has previously been reflected into the inverting reflector 98 is now reflected into the flat mirror 94. Similarly the beam that previously has been transmitted into the flat mirror 94 is now transmitted to the inverting reflector 98. Both these beams travel toward the polarization reflector 186 which reflects the beams through the second polarizer 180. The combined beams interfere and strike the photo-detector array 124.

Figure 6:
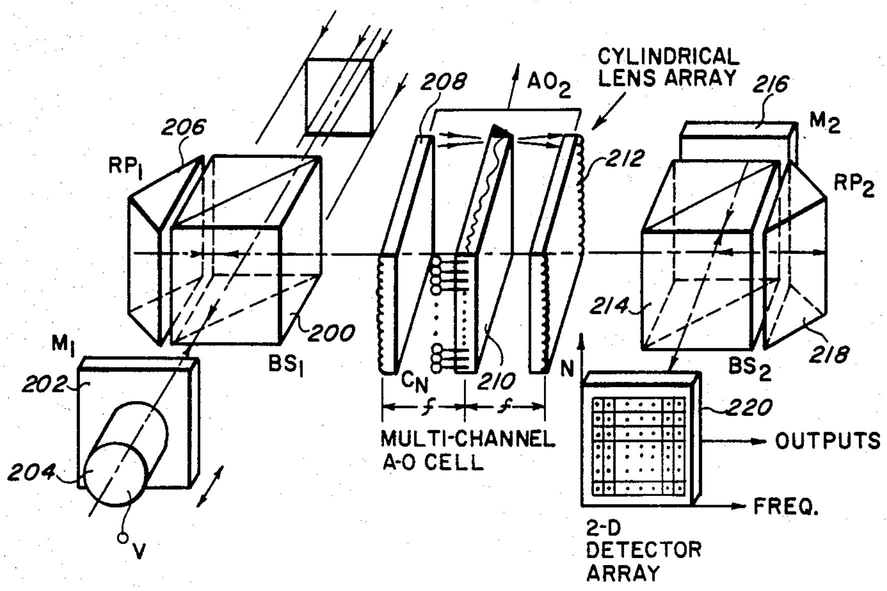
FIG. 6 is a pictorial representation of an embodiment of the invention of multiple Fourier transforms.

The Fourier transformers heretofore described have all had two-dimensional form, i.e. no vertical structure has been described but it has been assumed that they extend only a finite distance in the vertical direction. By stacking such transformers one on top of another in an integrated structure it is possible to compactly transform much data in a parallel operation. An embodiment of a three-dimensional is shown in pictorial representation in FIG. 6 which can simultaneously perform many Fourier transforms on the same signal. This embodiment is the three-dimensional extension of the embodiment of FIG. 3 and is intended to perform the Fourier transformation over a wide frequency range.

A laser on which is impressed the signal S(t) provides a large beam of light that falls upon a first beam splitter 200, On the other side is a first flat mirror 202 mounted on a piezo electric driver 204 which provides phase shifts for DC and background subtraction. On another side of the first beam splitter 200 is positioned an inverting reflector 206. The beams upon exiting the first beam splitter 200 strike a first lens array 208 of cylindrical lenses of focal length f. Spaced a distance f from the first lens array 208 is a multi-channel Bragg cell 210. The channels are positioned on the line foci of the lens array 208. Each channel is controlled by a separate chirp signal having a different chirp bandwidth so that a different frequency range is being analyzed in each channel. A second lens array 212 is placed on the other side of the Bragg cell 210 symmetric to the first lens array 212. The two lens arrays 208 and 212 enhance coupling efficiency and reduce cross-talk between channels. The Bragg cell 210 produces +1 order diffracted beams which after being recollimated by the second lens array 212 enter a second beam splitter 214. Arranged about the second beam splitter 214 are a second flat mirror 216, a second inverting reflector 218, and a two-dimensional photo-detector array 220. The elements of each channel of the detector array 220 integrate the intensity of the beam resulting from the corresponding channel of the Bragg cell 210. Each of the channels represents a different frequency bandwidth. The elements in that channel of the detector array 220 represent frequencies within the bandwidth of that channel.

Other implementations of three-dimensional Fourier transformer are possible. For instance many separate signals can be simultaneously transformed by impressing the signals on separate and parallel sheet beams and passing them all through a tall single-channel Bragg cell that subjects all the sheet beams to the same chirped diffraction pattern.

Figure 7:
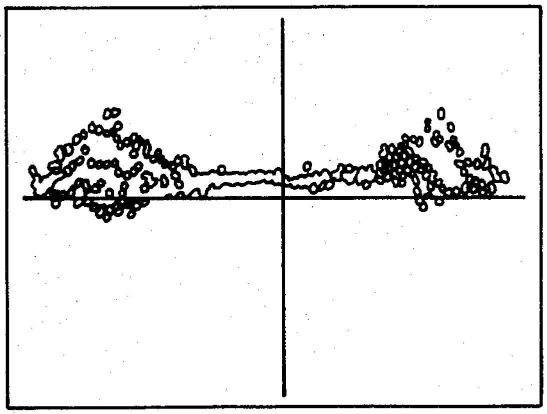
FIG. 7 is an oscilloscope trace of output of the embodiment of FIG. 3. The horizontal axis is frequency and the vertical axis is the Fourier transform of the input signal. An additional spatial carrier modulates the Fourier transform.

The use of the invention has been experimentally verified using the embodiment of FIG. 3. An incident sheet beam was produced of dimension about 2.54 cm×1.0 mm. A longitudinal wave Bragg cell of 1 cm aperture was used. The integration time T was 40 ms. The result of the transformation of a sinusoidal signal at 200 Hz is shown in FIG. 7. The trace represents that of the spatial carrier frequency $\exp(-2\omega_0\tau)$. The envelope of the carrier is the Fourier transform of S(t).

The Fourier transformers that have been described could also be implemented in other optical technologies such as fiber optics which offer increased miniaturization and rugged operation.

Obviously, numerous modifications and variations of the present invention are possible in light of the above teachings. It is therefore to be understood that within the scope of the appended claims, the invention may be practice otherwise than as specifically described herein.

What is claimed as new and desired to be secured by Letters Patent of the United States is:

1. An optical Fourier transformer of a temporally varying signal, comprising:

a source for providing a beam of coherent light;

means for intensity-modulating said coherent light beam by a temporally varying signal to be transformed;

an acousto-optical cell;

a control circuit for impressing a chirp signal upon the acousto-optical cell;

a first beam splitter for dividing said coherent beam into two incident beams;

first optical means for directing said two incident beams onto one side of said acousto-optical cell with the corresponding rays of said two beams passing through opposite ends of said acousto-optical cell, whereby each beam incident upon said acousto-optical cell produces a diffracted beam of the same order;

second optical means for recombining said two diffracted beams to form a recombined beam with corresponding rays being coincident; and detecting means for integrating over time the intensity of at least one portion of said recombined beam, whereby said integrated intensity is related to the Fourier transform of the temporally varying signal.

2. An optical Fourier transformer of a temporally varying signal, as recited in claim 1, wherein said acousto-optical cell is a Bragg cell.

3. An optical Fourier transformer of a temporally varying signal, as recited in claim 1, further comprising:

means for shifting the phaselength of the path of one of the incident beams and its diffracted beam between different runs of the temporally varying signal; and a data controller for differencing the intensities of a portion of said recombined beam between said different runs.

4. An optical Fourier transformer of a temporally varying signal, as recited in claim 1, wherein:

said acousto-optical cell has multiple channels for diffracting different sheets of said incident beams;

said control circuit impresses diferent chrip signals upon different channels of the acousto-optical cell; and said detecting means time-integrate the intensities of portions of different sheets.

5. An optical Fourier transformer of a temporally varying signal, as recited in claim 1, wherein:
said temporally varying signal comprises a plurality of component signals;
different sheets of the beam of coherent light are modulated by different said component signals; and
said detecting means integrate the intensities of portions of different sheets.

6. An optical Fourier transformer of a temporally varying signal, as recited in claim 5, further comprising:
means for translating one of the direct reflectors and inverting reflectors between different runs of the temporally varying signal; and
a data controller for differencing the intensities of a portion of said recombined beams between said different runs.

7. An optical Fourier transformer of a temporally varying signal, as recited in claim 1, wherein the first optical means comprise a first direct reflector and a first inverting reflector and the second optical means comprise a second beam splitter, a second direct reflector and a second inverting reflector.

8. An optical Fourier transformer of a temporally varying signal, as recited in claim 7, further comprising:
means for translating one of the direct reflectors and inverting reflectors between different runs of the temporally varying signal; and
a data controller for differencing the intensities of a portion of said recombined beam between said different runs.

9. An optical Fourier transformer of a temporally varying signal, as recited in claim 8, wherein:
the first and second beam splitters consist of one beam splitter; and
the first and second sets of three quarter-wave plates consist of one set of three quarter-wave plates; and further comprising:
a reflector disposed on the side of the acousto-optical cell opposite the one beam splitter; and
reflecting means for reflecting light incident thereon from one direction and transmitting light incident thereon from another direction, said reflecting means being disposed between said coherent light beam source and the one beam splitter and separting the recombined beam from said coherent beam towards said detecting means.

10. An optical Fourier transformer of a temporally varying signal, as recited in claim 7, wherein;
said chirp signal impressed upon said acousto-optical cell produces a shear wave;
said first and second beam splitters are polarization beam splitters;
and further comprising:
first means for polarizing the beam of light from said coherent beam at 45° to the plane in which the first beam splitter and first optical means lie;
second means for polarizing the combined beams of light at 45° to said plane;
a first set of three quarter-wave plates, the fast axes of all of which are set at 45° to said plane, said plates being disposed between the first beam splitter and the first inverting reflector, the first direct reflector, and the acousto-optical cell; and
a second set of three quarter-wave plates, the fast axes of all of which are set at 45° to said plane, said plates being disposed between the second beam splitter and the second inverting reflector, the second direct reflector, and the acousto-optical cell.

11. An optical Fourier transformer of a temporally varying signal, as recited in claim 10, further comprising:
means for shifting the phaselength of the path of one of the incident beams and its diffracted beam between different runs of the temporally varying signal; and
a data controller for differencing the intensities of a portion of said recombined beam between said different runs.

12. An optical Fourier transformer of a temporally varying signal, comprising:
a source of coherent light radiation producing a coherent input beam polarized at 45° to a plane:
means for intensity modulating said coherent input beam with the temporally varying signal;
an acousto-optical cell which supports shear waves;
a control circuit for launching said shear waves according to a chirp signal;
a polarization beam splitter for dividing said coherent input beam into two incident beams parallel to said plane;
a direct reflector disposed perpendicularly in the path of one of said incident beams;
an inverting reflector disposed perpendicularly in the path of the other of said incident beams, whereby the direct reflected and inverted reflected beam are recombined to form a recombined beam in said beam splitter into a diffracting beam incident upon the acousto-optical cell;
three quarter-wave plates, the fast axes of all of which are set at 45° to said plane, said plates being disposed between the beam splitter and the direct reflector, the inverting reflector, and the acousto-optical cell;
a reflector disposed opposite the acousto-optical cell from the beam splitter whereby the beams diffracted from the acousto-optical cell enter the beam splitter and are recombined in a direction toward the light source;
optical means for transmitting light incident thereon in one direction and reflecting light incident thereon in another direction, disposed in the paths of said coherent input beam and said recombined beam, whereby said coherent input beam and said recombined beam are separated;
polarizing means in the path of said recombined beam the polarization vector of which is set at 45° to said plane; and
detecting means for time-integrating the intensity of a portion of said recombined and polarized beam, whereby the time-integrated intensity is related to the Fourier transform of the temporally varying signal.

13. An optical Fourier transformer of a temporally varying signal, comprising:
a diode laser for providing a beam of coherent light which is intensity modulated by the temporally varying signal;
a first polarizer with its polarization vector set at 45° to a plane for polarizing said beam of coherent light;
a first polarization beam splitter for dividing said polarized coherent beam of light into two incident beams parallel to said plane;
a first flat mirror set perpendicularly to the path of one of said incident beams;
a first inverting reflector set perpendicularly to the path of the other of said incident beams;
a Bragg cell with a transducer on an end thereof set on a path of the beams reflected from said flat mirror and inverting reflector;

a control circuit for impressing a chirp signal upon the transducer, whereby beams incident upon the Bragg cell produce diffracted beams;

three quarter-wave plates with their polarization vectors set at 45° to said plane, said plates being disposed between the first polarization beam splitter and the first flat mirror, the first inverting reflector, and the Bragg cell;

a second polarization beam splitter disposed to intercept said diffracted beams and to split them into two beams parallel to said plane;

a second flat mirror set perpendicularly to the path of one of said split beams;

a second inverting reflector set perpendicularly to the path of the other of said split beams;

three quarter-wave plates with their polarization vectors set at 45° to said plane, said plates being disposed between the second polarization beam splitter and the second flat mirror, the second inverting reflector, and the Bragg cell;

a second polarizer with its polarization vector set at 45° to said plane, disposed on a side of said second polarization beam splitter to intercept the beams which have been reflected by the second flat mirror and the second inverting reflector; and a photo-detector array disposed opposite the second polarizer from the second beam splitter for time-integrating the intensities of the different portions of the split beam incident upon the elements thereof, whereby the distribution of integrated intensities is related to the Fourier transform of the time varying signal.

14. An optical Fourier transformer of a temporally varying signal, as recited in claim 13, further comprising:

means for translating one of the flat mirrors and inverting reflectors between different runs of the temporally varying signal; and a data controller for differencing the intensities of a portion of said recombined beams between said different runs.

15. A method of Fourier analyzing a temporally varying signal, comprising the steps of:

modulating a beam of coherent light with the temporally varying signal;

splitting the modulated beam into two incident beams;

directing said incident beams onto one side of an acousto-optical cell with the corresponding rays thereof passing through opposite ends of said acousto-optical cell;

impressing a chirp signal upon an end of said acousto-optical cell, whereby each of said two incident beams produces a diffracted beam of the same order in said acousto-optical cell;

recombining said two diffracted beams to form a recombined beam with the corresponding rays thereof being coincident; and integrating over time the intensity of at least one portion of said recombined beam, whereby said integrated intensity is related to the Fourier transform of the temporally varying signal.

* * * * *